May 18, 1926.
G. W. DE LOACH
1,585,538
PISTON ACTUATOR FOR GREASE COMPRESSORS
Filed May 1, 1925
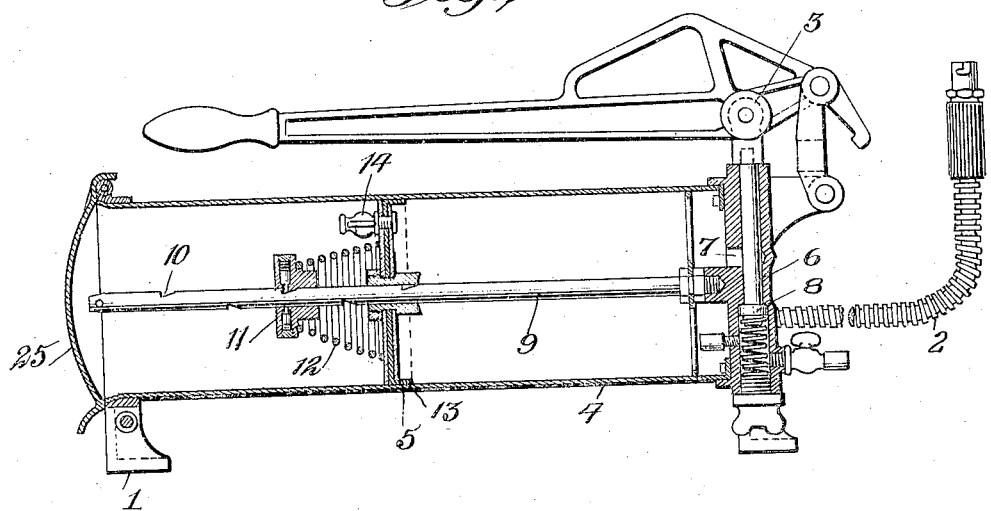
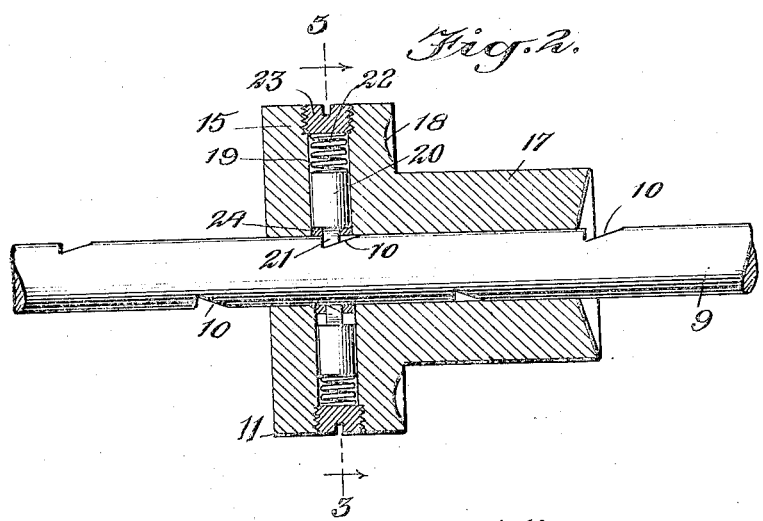
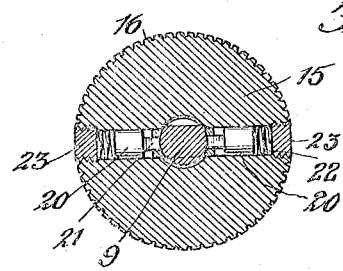
WITNESSES
INVENTOR
George W. De Loach
BY
ATTORNEYS Patented May 18, 1926.

1,585,538

UNITED STATES PATENT OFFICE.

GEORGE W. DE LOACH, OF NEW YORK, N. Y.

PISTON ACTUATOR FOR GREASE COMPRESSORS.

Application filed May 1, 1925. Serial No. 27,290.

This invention relates to grease guns or compressors and particularly to an improved piston actuator therefor and has for an object to provide an improved construction wherein the piston will function continually in an efficient manner so that always the desired quantity of grease may be expelled from the compressor.

Another object of the invention is to provide a piston actuator for grease compressors wherein an adjustable tension device is provided for the piston capable of functioning in either long or short cylinders and continually act to cause the piston to press the grease and thereby eliminate all air bubbles in the grease.

A further object, more specifically, is to provide a piston actuator for grease compressors wherein the actuator includes a catch and spring adjustably mounted so that the tension of the spring may be restored from time to time to cause a continuous pressure on the piston.

In the accompanying drawing—

Figure 1 is a longitudinal vertical sectional view through a grease compressor with a piston actuator embodying the invention shown in connection therewith.

Figure 2 is an enlarged fragmentary sectional view through the catch mechanism shown in Figure 1, the same embodying certain features of the invention.

Figure 3 is a transverse sectional view through Figure 2 on line 3—3, the same being on a reduced scale.

Referring to the accompanying drawing by numerals, 1 indicates a grease compressor of a well known type which is provided with a discharge member 2, a pump structure 3, a grease carrying cylinder 4 and a piston 5. The pump 3 is provided with a plunger 6, which when raised, produces a rarefaction so that some of the grease is drawn in from the cylinder 4 through the opening 7 and is later forced out through the outlet 2. A spring pressed disk 8 normally closes the bottom in which the plunger 6 functions so that if there should be too great a resistance at any point, the disk 8 may move down against the action of the spring and thereby prevent breakage while allowing the grease to gradually pass out through member 2.

The various devices just described are old and, therefore, form no part of the present invention except in combination. In addition to the parts just described, there is provided a rod 9 adapted to guide the piston 5 but instead of using the rod as heretofore used, a similar shaped rod is provided but formed with a number of notches 10 for receiving certain parts of the catch 11. This catch co-acts with a spring 12 for causing the spring to be maintained under tension and the spring in turn acts to cause the piston 5 to press against the grease and maintain a continuous pressure in the opening 7 so that as soon as the plunger 6 has been moved upwardly out of the way the grease will quickly move into the space thus provided.

In providing the piston 5, instead of using the piston as heretofore provided, a cup 13 is provided which faces opening 7 instead of the opposite direction as heretofore used. A vent 14 is also provided in the piston 5, said vent being of any suitable structure, as for instance, an ordinary pet cock. The catch 11 is of a special structure as shown particularly in Figures 2 and 3. From these figures it will be observed that the catch 11 is provided with an enlarged annular portion 15 which is preferably roughened or knurled at 16. Extending from the enlarged portion 15 is a tubular sleeve 17, said enlarged portion 15 and sleeve 17 having a bore whereby the device may be slidingly mounted on the shaft 9. Preferably, an annular depression 18 is provided in the enlarged portion 15, said depression receiving one end of a spring 12 and thereby holding the same properly located so that when the catch 11 is moved, a proper tension may be produced in the spring 12. The enlargement 15 is provided with a pair of radial bores 19, each bore being provided with a sliding member 20 having a projecting catch bolt 21 adapted to fit into any of the notches 10. A spring 22 acts on each of the members 20 for causing the same to move toward the shaft or rod 9 while a threaded plug 23 acts to hold the spring 22 so that it will always function. A guiding member 24 is provided at the inner end of member 20 so as to guide the bolt 21 in its back and forth movement.

In operation, when the compressor is empty, the end 25 is removed and then the enlargement 15 grasped and turned for a quarter of a revolution. This will cause the bolts 21 to move back against the action of the springs 22, said action being caused as the bolts leave the notches 10 and rest on the uninterrupted surface of the rod 9. The catch 11 is then slid off the rod as well as the piston 5. A new supply of grease is then provided in the cylinder 4, piston 5 replaced and then the catch 11 of spring 12 re-mounted on the rod 9. The catch 11 is usually pressed until the bolts 21 interlock with the first notch 10. After this has been done, the pet cock 14 is opened unless it is already open and the air in front of the piston 5 is allowed to escape. After the parts have been adjusted as described, the end 25 is replaced and the compressor is then ready for use. After an appreciable amount of grease has been used, end 25 is removed and the catch 11 pushed forwardly until it engages one of the notches 10 near the opening 7. Usually the catch is forced forwardly as far as it will go and this will put the piston under an appreciable tension so that it will travel for quite a distance before it is necessary to again shift or adjust the catch 11.

What I claim is:

1. The combination with a grease compressor provided with a cylinder and a piston arranged within the cylinder, of a rod arranged in said cylinder formed with a plurality of notches on diametrically opposite sides, a spring for moving the piston in said cylinder, and a catch device for maintaining said spring under compression, said catch device being provided with a pair of diametrically opposite catch bolts capable of moving radially, said bolts being adapted to snap into said respective notches as the catch is moved along the rod for maintaining the spring under tension, said catch bolts being adapted to be retracted when the catch device is rotated so that the catch bolts will be positioned at right angles to the notches whereby the catch device may be moved off said rod.

2. The combination with a grease compressor provided with a stationary rod extending longitudinally of the cylinder of the compressor, said rod being formed with notches and a piston slidingly mounted on said rod, of a catch slidingly mounted on said rod and formed with catch bolts adapted to project into the respective notches according to the position of the catch along the rod, and a spring held under compression by said catch, said spring having one end bearing against said piston and acting as means for propelling the piston.

3. The combination with a grease compressor provided with a cylinder, a piston arranged in said cylinder and a stationary rod for the piston positioned in said cylinder, of a spring positioned to act against the piston and give the same a tendency to move along said rod for compressing the grease in the cylinder, said spring presenting the sole power means for moving the piston, and a catch surrounding said rod and manually movable along the rod for maintaining said spring under compression, said catch being formed with means for gripping said rod.

GEORGE W. DE LOACH.